US008095396B1

(12) United States Patent
Zublin, Jr. et al.

(10) Patent No.: US 8,095,396 B1
(45) Date of Patent: Jan. 10, 2012

(54) COMPUTER SYSTEM FOR UNDERWRITING A PERSONAL GUARANTY LIABILITY BY UTILIZING A RISK APPORTIONMENT SYSTEM

(75) Inventors: Casper W. Zublin, Jr., Newport Beach, CA (US); Andreas P. Graham, Newport Beach, CA (US)

(73) Assignee: Asterisk Financial Group, Inc., Middletown, CT (US)

( * ) Notice: Subject to any disclaimer, the term of this patent is extended or adjusted under 35 U.S.C. 154(b) by 131 days.

(21) Appl. No.: 12/403,964

(22) Filed: Mar. 13, 2009

Related U.S. Application Data

(60) Provisional application No. 61/040,090, filed on Mar. 27, 2008.

(51) Int. Cl.
*G06Q 40/00* (2006.01)
(52) U.S. Cl. ............ 705/4; 705/35; 705/36 R; 705/36 T
(58) Field of Classification Search ....... 705/4, 35–36 R
See application file for complete search history.

(56) References Cited

U.S. PATENT DOCUMENTS

| | | | | |
|---|---|---|---|---|
| 5,025,138 A | * | 6/1991 | Cuervo | 705/38 |
| 6,078,903 A | * | 6/2000 | Kealhofer | 705/36 R |
| 6,336,096 B1 | * | 1/2002 | Jernberg | 705/4 |
| 7,028,005 B2 | * | 4/2006 | Messmer et al. | 705/35 |
| 7,593,879 B2 | * | 9/2009 | Glinberg et al. | 705/35 |
| 2001/0037274 A1 | * | 11/2001 | Monticciolo | 705/35 |
| 2002/0138415 A1 | | 9/2002 | Siska | |
| 2003/0135395 A1 | * | 7/2003 | Carfi et al. | 705/4 |
| 2004/0088203 A1 | | 5/2004 | Kakuwa et al. | |
| 2004/0243509 A1 | * | 12/2004 | Schulkins | 705/38 |
| 2005/0010506 A1 | * | 1/2005 | Bachann | 705/35 |
| 2006/0031088 A1 | | 2/2006 | Risen, Jr. et al. | |
| 2006/0206416 A1 | | 9/2006 | Farias | |
| 2007/0185742 A1 | * | 8/2007 | Chapin et al. | 705/4 |
| 2007/0288273 A1 | * | 12/2007 | Rojewski et al. | 705/4 |
| 2008/0027763 A1 | * | 1/2008 | Caballero et al. | 705/4 |
| 2008/0052224 A1 | * | 2/2008 | Parker | 705/38 |
| 2008/0126139 A1 | * | 5/2008 | Prendergast et al. | 705/4 |
| 2008/0167904 A1 | * | 7/2008 | Rudich et al. | 705/4 |
| 2009/0043637 A1 | * | 2/2009 | Eder | 705/10 |
| 2009/0240609 A1 | * | 9/2009 | Cho et al. | 705/30 |
| 2010/0287092 A1 | * | 11/2010 | Colman et al. | 705/38 |

(Continued)

OTHER PUBLICATIONS

Abstract in English of KR 20070042605 A.

(Continued)

*Primary Examiner* — Narayanswamy Subramanian
(74) *Attorney, Agent, or Firm* — Knobbe Martens Olson & Bear LLP

(57) ABSTRACT

A risk apportionment system for providing personal guarantee insurance or commercial collateral insurance may include a risk management module that can run on one or more processors. The risk management module can evaluate a guarantor for the insurance, where the guarantor is required by an obligor to provide a personal guaranty on a business obligation. The risk management module includes, in some implementations, a policy risk component that determines a degree of policy risk to an insurer corresponding to the guarantor and a portfolio risk component that determines a degree of portfolio risk to the insurer corresponding to the guarantor. The system may further include a policy generator operative to generate an insurance policy providing for a variable retention in response to a determination that the degrees of policy and portfolio risk corresponding to the guarantor are below a threshold of risk.

4 Claims, 8 Drawing Sheets

U.S. PATENT DOCUMENTS

2011/0016042 A1* 1/2011 Cho et al. .................. 705/38

OTHER PUBLICATIONS

Cox et al., "Valuation of structured risk management products," *Insurance: Mathematics and Economics 34*, 2004, pp. 259-272, Elsevier B.V.

"Erissa Personal Guarantee Insurance," Xeal Precision Marketing, http://www.xeal.com/articles/Erissa-Personal-Guarantee-Insurance.htm (retrieved on Aug. 20, 2008).

Tavakoli, J., "Credit Derivatives & Synthetic Structures—A Guide to Instruments and Applications Second Edition", pp. 5-72 (2001).

Briys, E. et al., "Insurance From Underwriting to Derivatives—Asset Liability Management in Insurance Companies", pp. 1-39 (2001).

* cited by examiner

COMPUTER SYSTEM FOR UNDERWRITING A PERSONAL GUARANTY LIABILITY BY UTILIZING A RISK APPORTIONMENT SYSTEM

RELATED APPLICATION

This application claims priority from U.S. Provisional Patent Application No. 61/040,090 filed Mar. 27, 2008, and entitled "Personal Guaranty Insurance," the disclosure of which is hereby incorporated by reference in its entirety.

BACKGROUND

Insurance is generally considered to be a contract whereby one undertakes to indemnify another against loss, damage or liability from a contingent or unknown event, in exchange for a financial premium. Insurers typically assume most or all of the risk associated with the potential losses, damages, or liabilities with a predefined deductible and a limit of coverage. For example, a directors and officers liability insurer might assume the risk of up to one million dollars (e.g., limit of coverage) of an insured's future potential liability expenses related to their role as either a director or officer of an entity, beyond which the insured assumes any additional risk. Further, the insured might retain a portion of risk by having to pay the first dollars due in a potential claim, which is sometimes referred to as a deductible. For example, a ten-percent deductible on the one million dollar policy would be one hundred thousand dollars, which would typically be paid by the insured before the benefits of the policy can apply.

Two general principles underlying insurance include the concepts of "peril" and "hazard." A peril may be an actual cause of a loss. Many types of events can result in a peril. A hazard may be anything that increases the chance of a loss or the severity of the loss. Moral hazard is a type of hazard that arises because an entity does not bear the full consequence of its actions, and therefore has a tendency to act less carefully than it otherwise would. As a result, the entity may leave another party to bear some responsibility for the consequences of the entity's actions. In some cases, moral hazard deals with an individual's state of mind, attitudes, behaviors, and habits.

SUMMARY OF CERTAIN EMBODIMENTS

In certain embodiments, a risk apportionment system for providing guaranty insurance includes a risk management module that can run on one or more processors. The risk management module can evaluate a guarantor for guaranty insurance, where the guarantor is required by an obligor to provide a guaranty on an obligation. The risk management module includes, in some implementations, a policy risk component that determines a degree of policy risk to an insurer corresponding to the guarantor, and a portfolio risk component that determines a degree of portfolio risk to the insurer corresponding to the guarantor. The system may further include a policy generator operative to generate a guaranty policy providing for a variable retention in response to a determination that the degrees of policy and portfolio risk corresponding to the guarantor are below a threshold of risk.

For purposes of summarizing the disclosure, certain aspects, advantages and novel features of certain inventions have been described herein. It is to be understood that not necessarily all such advantages may be achieved in accordance with any particular embodiment of the inventions disclosed herein. Thus, the inventions disclosed herein may be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION

One example scenario in which a moral hazard could exist is if insurance with a fixed deductible and limits of coverage were used to insure personal guarantys (sometimes referred to as commercial guarantys). Lenders often require personal guarantys of one or more owners, shareholders, officers, directors, or partners of a business when the lender gives a loan to the business. By giving a personal guaranty, these individuals become guarantors that can be obligated to pay for the loan with personal assets. Owners, shareholders, officers, directors, and partners can exert control or influence over a business. Consequently, if insurance were used to insure such a personal guaranty, a moral hazard could result, making profitable underwriting on such an insurance product unlikely.

Additionally, a guarantor seeking to insure the peril of a personal guaranty liability arising from an uncured business loan default may present a risk of adverse selection. Adverse selection in general can be the tendency of entities that need insurance to seek insurance at the expectation of a known or pending peril. Thus, a guarantor who seeks insurance to cover the personal guaranty peril may need such insurance, making profitable underwriting further unlikely.

Certain embodiments of this disclosure describe systems and methods for providing insurance to at least partially cover the peril of a personal guaranty being called. This insurance may be a form of risk apportionment insurance that apportions risk between an insurer and a guarantor by providing a variable retention to the guarantor. The variable retention may be designed in certain embodiments to reduce or minimize the possibility of moral hazard. For example, a guarantor may retain a risk that can vary based at least partly on a liquidation value of business assets. In one embodiment, if this value is relatively higher, the guarantor may retain less risk, and if this value is relatively lower, the guarantor may retain more risk. As a result, the guarantor may, in certain embodiments, be incentivized to preserve the assets of the business, and the moral hazard can therefore be reduced or eliminated. Moreover, adverse selection may be reduced by requiring guarantors who wish to obtain an insurance policy to request the policy within a predetermined timeframe after loan origination. Additionally, adverse selection can be reduced or minimized from the loan originator's perspective by having the policy being available after the loan origination.

As used herein, the term "risk," in addition to having its ordinary meaning, can refer to the chance or probability of injury, damage, or loss.

Figure 1A:
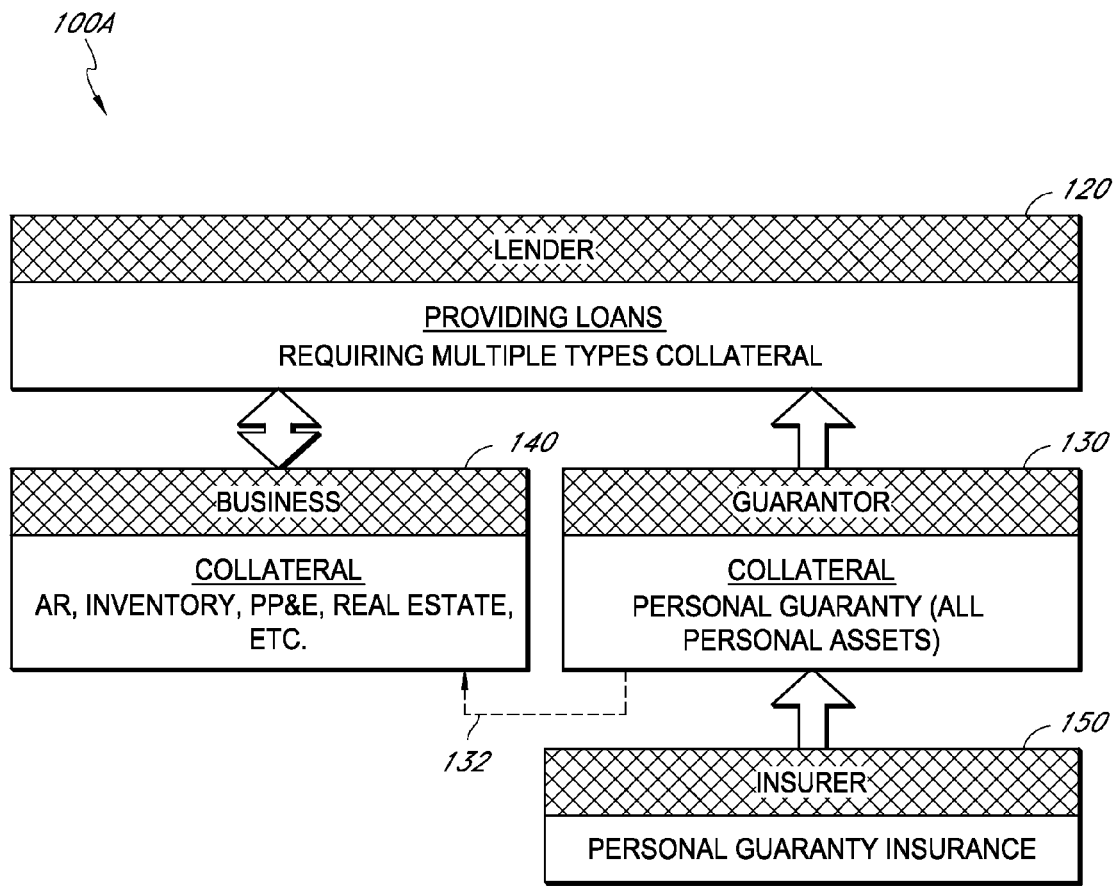
FIGS. 1A and 1B are block diagrams illustrating example scenarios where risk-apportionment insurance may be employed.

FIG. 1A depicts an example personal guaranty scenario 100A. In the scenario 100A, a lender 120 (or other provider of credit) provides a loan to a business 140 with a personal guaranty from a guarantor 130 (or guarantors). Advantageously, in certain embodiments, insurance may be provided for the guarantor 130 to reduce the guarantor's 130 financial risk of the personal guaranty being called. This insurance can be structured to reduce or eliminate moral hazard and/or adverse selection.

The lender 120 might be a bank, thrift, credit union, or other financial institution. The business 140 may be an entity, such as a corporation, a partnership, or any other form of business. The business 140 may also be any organization, including a non-profit organization. The guarantor 130 may be an owner, shareholder, officer, director, or a partner in the business 140, or the like, or an individual with no interest in the business 140 but who has pledged collateral as a service to the business. In one embodiment, the guarantor 130 has some degree of control or influence over the business 140. The guarantor 130 may have substantial control or influence over the business 140. This control or influence is indicated by a dashed arrow 132 in FIG. 1. Alternatively, the guarantor 130 may have little or no control or influence over the business. The guarantor 130 may also be an entity other than an individual, such as a subsidiary corporation.

Many lenders 120 request multiple forms of collateral to secure a business loan. In some cases, the lender 120 may request two forms of collateral, including the assets of the business 140 and a personal guaranty by the guarantor 130. The assets of the business 140 may include accounts receivable (AR), inventory, property, plant, and equipment (PP&E), real estate, and the like. The personal guaranty by the guarantor 130 may obligate the guarantor 130 to personally repay the loan if the business 140 has a deficiency of collateral (e.g., and/or defaults on the loan). The personal guaranty may be individual, or if there are multiple guarantors 130, the guarantors 130 may be jointly liable, severally liable, or jointly and severally liable.

Most individuals or entities prefer not to provide a personal guaranty because as guarantors 130, they may assume a significant personal financial risk. Guarantors 130 may therefore wish to insure the financial risk they have assumed. However, insurance with a fixed deductible and limits of coverage might be ill-suited to this scenario 100A. In particular, insurance could reduce or eliminate a guarantor's 130 incentive to successfully maintain the business 140 or maximize liquidation value of the business in the event of a default. As a result, insurance for personal guarantys could create a substantial moral hazard and/or risk of adverse selection and make profitable underwriting unlikely.

In certain embodiments, an insurer 150 may provide the guarantor 130 with a form of risk-apportionment insurance. This risk-apportionment insurance, referred to sometimes herein as personal guaranty insurance (PGI), can apportion the risk of default on the loan between the guarantor 130 and the insurer 150. For example, the PGI can provide for a variable retention. In certain embodiments, the variable retention represents a variable amount of risk that is retained by the insurer and/or guarantor. Variable retention is described in greater detail with respect to FIG. 5 below.

Various implementations of PGI can provide substantial value to the guarantor 130 if the guarantor 130 maintains the liquidation value of the business's 140 collateral. However, in the event of substantial asset degradation, the risk shifts back to the guarantor 130. For example, the variable retention may increase as the liquidation value of the business's collateral decreases. This risk-sharing mechanism can help maintain the correct alignment of interests between the lender 120, guarantor 130, and the insurer 150, thereby reducing or avoiding the moral hazard and/or adverse selection that might occur with currently-available insurance products.

PGI may be particularly valuable for individuals who own illiquid assets or substantially illiquid assets, such as business assets. When a forced liquidation of these assets occurs, their asset value can drop substantially, resulting in a dramatic reduction in the net worth of these individuals. Thus, PGI may, in certain embodiments, help prevent cascading financial ruin to these individuals when their illiquid assets are liquidated. PGI may also be valuable for individuals who own liquid but not illiquid assets.

Although these risk-sharing principles are described herein primarily in the context of personal guarantys for business loans, in certain embodiments, the systems and methods described herein may also be applied to any obligation owed to an obligor. The obligation may be a loan, a lease, a surety bond, a trade credit, a combination of the same, or the like. The obligor may be, for example, a lender providing a loan, a landlord providing a lease, a surety providing a bond, a party providing a trade credit, or the like. For instance, a business may lease office space, but owners of the business may be required by a landlord to offer personal guarantys regarding payment of the lease. A surety may provide a personal guaranty that a party's obligation to another party will be performed. Or, one trade partner may request a personal guaranty from another so that the other trade partner will be obligated to purchase goods or services from the first trade partner. In each of these scenarios, and in other personal guaranty scenarios, the risk apportionment principles described herein may be applied.

Figure 1B:
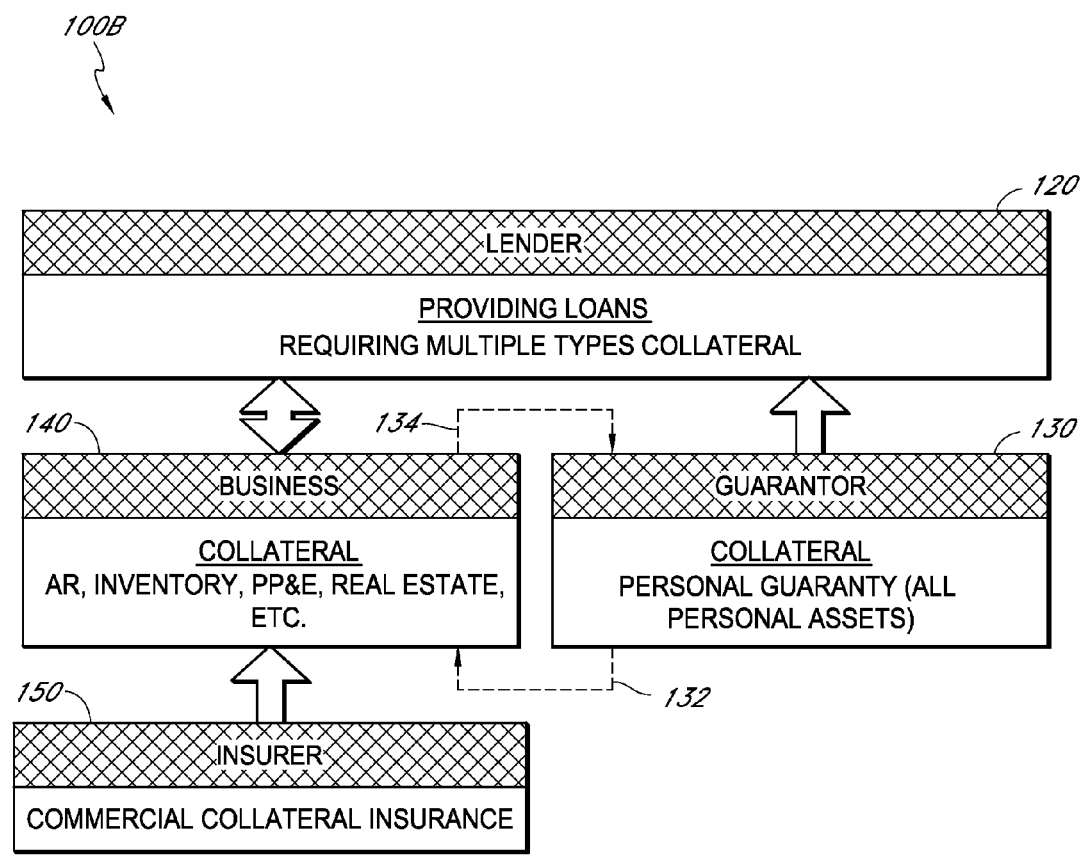

FIG. 1B depicts an example scenario 100B where commercial collateral insurance (CCI) may be applied. The scenario 100B is similar to the scenario 100A, except that the insurance is provided by the insurer 150 to the business 140 instead of to the guarantor 130.

In the scenario 100B shown, the business 140 obtains a CCI policy from the insurer 150 and may also provide an indemnity 134 to the guarantor. Thus, in one implementation, if a deficiency of business collateral caused the lender 120 to call the personal guaranty of the guarantor 130, the business 140 could initiate a claim with the insurer 150 and indemnify the guarantor 130 for the personal guaranty. Thus, in one embodiment, because the business 140 obtains the CCI policy and the guarantor 130 obtains an indemnity, the guarantor 130 ultimately receives the insurance payment. Alternatively, the guarantor could initiate the claim with the insurer 150.

In another embodiment, the business may purchase the CCI from the insurer 150 and pay premiums, but the claims payout may be provided directly from the insurer 150 to the guarantor 130.

In still other embodiments (not shown), both the business 140 and the guarantor 130 may obtain insurance (PGI or CCI). Many other configurations are also possible. In addition, for ease of illustration, the remainder of this disclosure shall be described in the context of PGI; however, the features described herein may also be applied to CCI. More generally, CCI and PGI may be considered forms of miscellaneous liability insurance.

Figure 2:
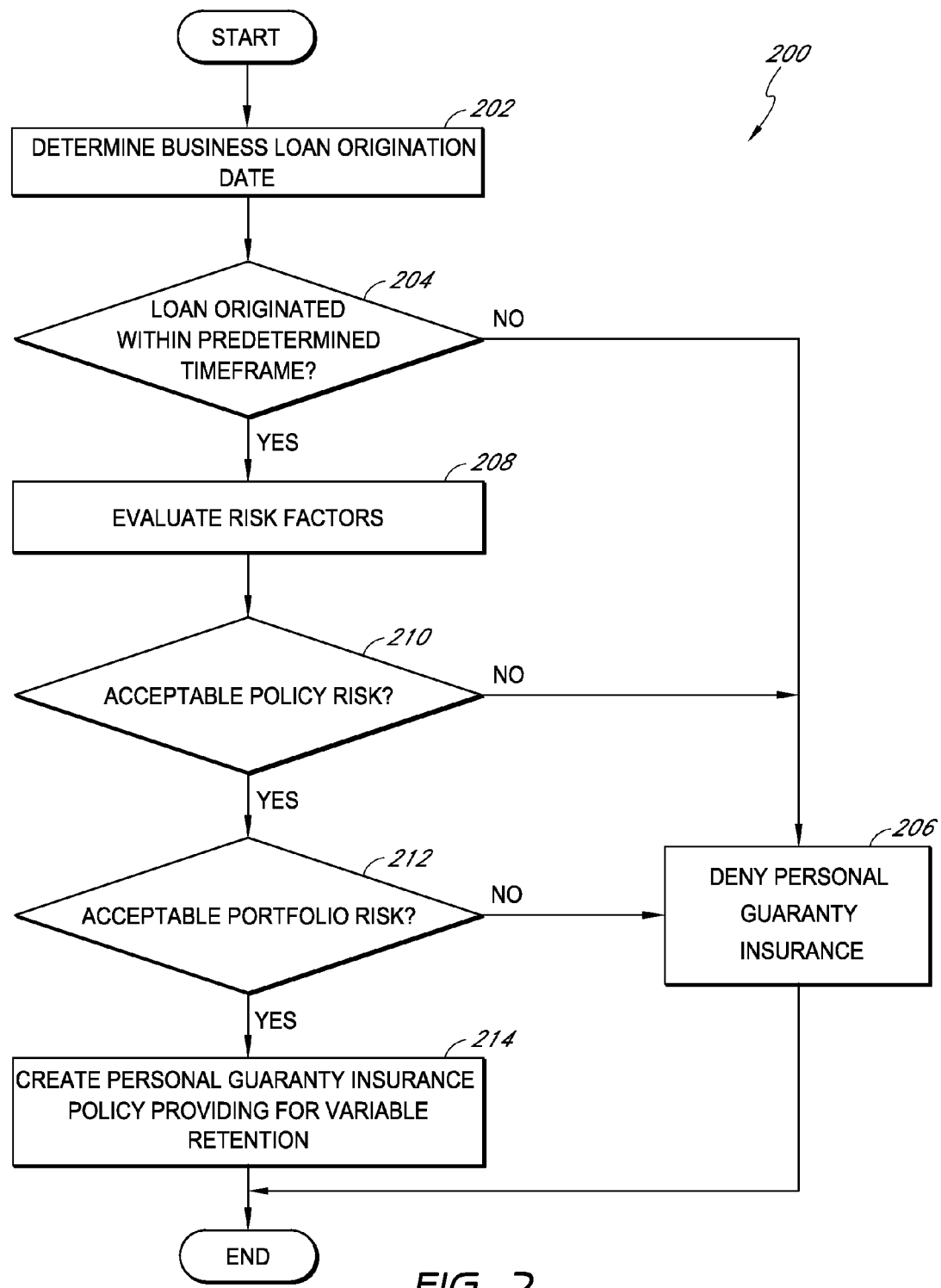
FIG. 2 is a flowchart illustrating an embodiment of a process for generating a risk apportionment insurance policy.

FIG. 2 illustrates an embodiment of a risk apportionment process 200 for generating a risk apportionment insurance policy, such as a PGI policy. The risk apportionment process 200 may be implemented by a computer system, such as by one of the systems described below with respect to FIGS. 3 and 4. The risk apportionment process 200 may enable insurers to evaluate guarantors for PGI and create PGI policies that reduce the insurers' risk of providing such insurance while providing meaningful coverage to the insured.

At block 202, a business loan origination date is determined. The loan origination date may be provided to the insurer by a guarantor or the lender. As will be described in greater detail below with respect to FIGS. 3 and 4, software may be provided that enables a guarantor to provide the origination date and other information electronically to an insurer. The loan origination date may be the date that a business was approved for a loan, the date that the business received the loan money, or the like. The insurer may verify the loan origination date, amount, and other particulars of the loan by, for example, calling the lender.

Continuing, at decision block 204, it is determined whether the loan originated within a predetermined timeframe. The length of the predetermined timeframe may be defined by the insurer to reduce a risk of adverse selection. For example, the insurer may determine that if a guarantor requests PGI within a certain time from loan origination, that the adverse selection risk is lower. In one embodiment, the predetermined timeframe is six months, but other timeframes may be chosen. The insurer may determine the timeframe based on statistics of past loan defaults, money paid out over time to policyholders, and the like. If the loan did not originate within the predetermined timeframe, PGI is denied at block 206.

In other embodiments, however, the insurer may still provide PGI when the loan originated outside of a predetermined timeframe. However, the insurer may require guarantors requesting PGI outside of the predetermined timeframe to pay higher premiums, retain more risk, and/or the like.

Additionally, in some implementations, PGI may not be available until the loan has been made. By making the decision to provide a PGI policy distinct from the lending decision, the insurer may prevent the lender from relying on the PGI policy and performing less due diligence to determine the business's fitness for the loan. In contrast, if the lender knew that a PGI policy would be provided, the lender might scrutinize the business less closely and grant a higher-risk loan. As a result, the insurer might take on more risk than would be desired by the insurer.

Risk factors are evaluated at block 208 to determine whether providing PGI to the guarantor represents an acceptable risk to the insurer. More detailed examples of these risk factors are described below with respect to FIG. 3. For instance, it is determined at decision block 210 whether the risk factors pose an acceptable policy risk to the insurer. In an embodiment, an unacceptable policy risk would represent a significant risk of loss on the policy. If the policy risk is unacceptable, PGI is denied at block 206. Alternatively, the higher the policy risk, the higher the premiums and retained risk the guarantor may be required to assume to obtain the PGI.

Otherwise, it is determined at decision block 212 whether the risk factors pose an acceptable portfolio risk. In an embodiment, an unacceptable portfolio risk represents a risk of accumulation to the insurer's portfolio. The risk of accumulation can be a risk that arises when multiple individual policy risks are correlated such that a single event may affect many or all of the policy risks. If the portfolio risk is unacceptable, PGI is denied at block 206. Alternatively, the higher the portfolio risk, the higher the premiums and retained risk the guarantor may assume to obtain the PGI.

If the portfolio risk is acceptable to the insurer, a PGI policy is generated at block 214. The PGI policy may provide for a variable retention that in certain embodiments apportions a variable amount of risk between the guarantor and the insurer.

Figure 3:
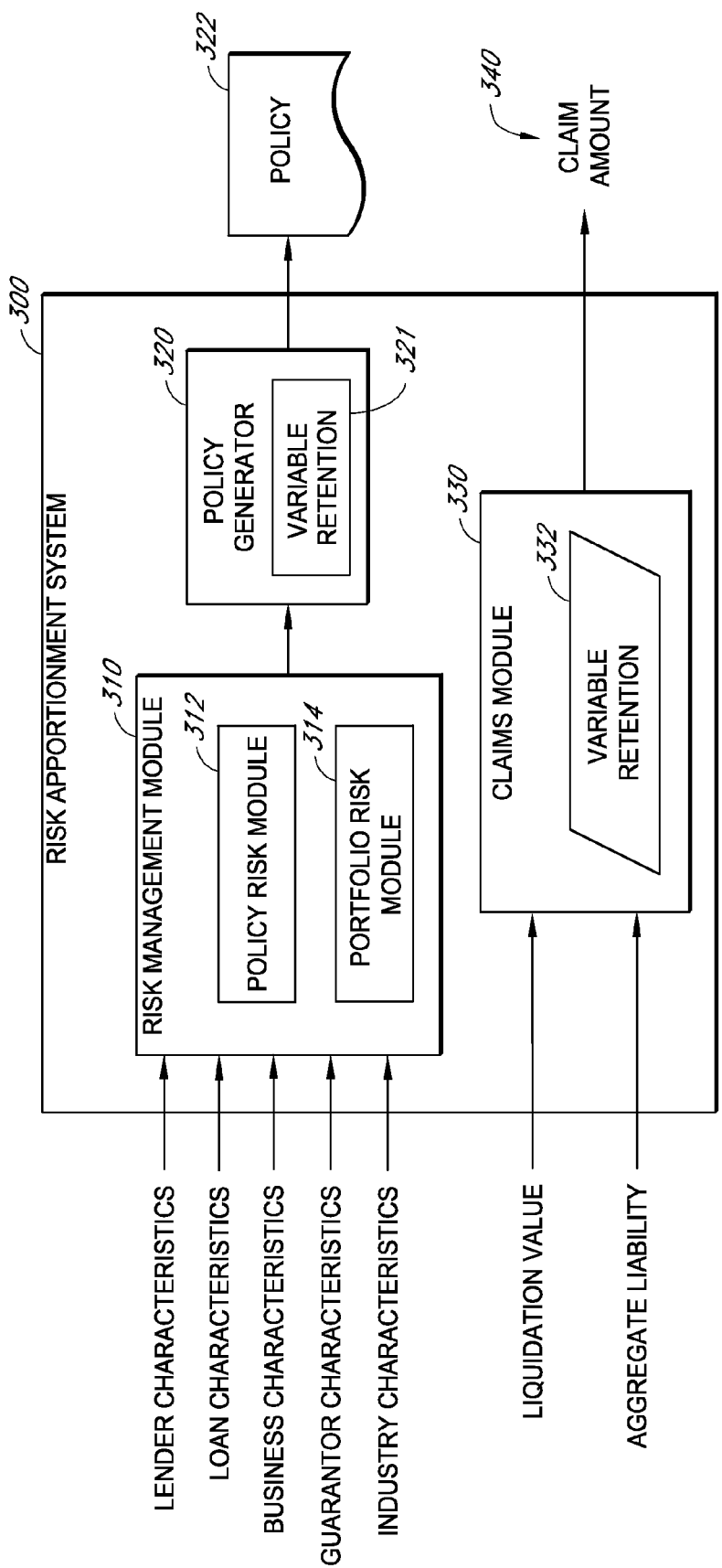
FIG. 3 is a block diagram illustrating an embodiment of a system for providing risk-apportionment insurance.

FIG. 3 illustrates an embodiment of a risk apportionment system 300 that may perform the risk apportionment process 200 described above with respect to FIG. 2. In certain embodiments, the risk apportionment system 300 may be implemented by a computer system under the direction of an insurer (see, e.g., FIG. 4). The risk apportionment system 300 can generate PGI policies and process claims on the policies.

The depicted example risk apportionment system 300 includes a risk management module 310, a policy generator 320, and a claims module 330. The risk management module 310 may be a software component or the like that may receive one or more inputs and determine, based at least partly on those inputs, whether a guarantor should receive PGI. The inputs may include data representing characteristics of the guarantor, lender, loan, business, and industry of the business, among others. In certain embodiments, the risk management module 310 transforms the characteristics data into a policy having a premium and a variable retention model.

The risk management module 310 in the depicted embodiment includes a policy risk module 312 and a portfolio risk module 314. In an embodiment, the policy risk module 312 may be a software component or the like that analyzes the characteristics data to determine whether providing a PGI policy to the guarantor would represent an unacceptable policy risk to the insurer. In an embodiment, an unacceptable policy risk would represent a significant risk of loss on the policy. The policy risk module 312 may, for instance, compare the characteristics data with data obtained from an actuarial database (see FIG. 4). The actuarial database may include, for example, data on risk levels corresponding to various guarantor, business, loan, industry, and/or lender characteristics.

The policy risk module 312 can analyze the guarantor, business, loan, and lender characteristic data according to one or more underwriting guidelines to determine policy risk. Tables 1-4 below illustrate examples of characteristic data and underwriting guidelines for various characteristics. In addition, example characteristic data for a guarantor might include a credit score, biographical data (e.g., age, occupation, and so forth), the guarantor's net worth, and the guarantor's assets and liabilities, among other things. The characteristic data for a business might include a credit score, a Paydex score, a balance sheet, a Dun & Bradstreet rating, data obtained from a cash flow analysis, working capital, financial ratios (e.g., current accounts receivable and accounts payable ratios as proxies for working capital), financial indicators, data regarding the type of the business, data regarding the age of the business, and the like. Similar characteristic data might be used for the lender, and this characteristic data may also include credit monitoring statistics, credit quality statistics, and the like. The example guidelines may vary substantially in certain embodiments.

TABLE 1

Example Policy Risk Guidelines-Guarantor

| Guarantor Characteristics | Guidelines |
|---|---|
| Guarantor Eligibility: | No prior bankruptcies, minimum personal credit score(s), no felony convictions, no fraud/theft misdemeanor convictions, no DUI or drug convictions, etc. |
| Documentation Required from Guarantor: | Fully executed loan contract documents, certified net worth statement, balance sheet, profit & loss statement, full disclosure of all contingent liabilities whether or not existing as personal guarantys |
| Guarantor's Relationship with Lender: | 3 years or greater |
| Guarantor type: | Individual or Entity is acceptable |
| Guarantor's Other Insurance Coverage: | Guarantor/business should have additional coverage, such as General Liability, Errors & Omissions (if appropriate), Officers and Directors Liability (if appropriate), Auto (if appropriate), Workers Compensation, Unemployment (current), Key Man Life (if appropriate) |

TABLE 2

Example Policy Risk Guidelines-Business

| Business Characteristics | Guidelines |
|---|---|
| Longevity of the Business: | 5 years or greater |
| Business Type: | Excludes non-franchise retail food and beverage and other low success rate businesses |
| Guarantor's/Business Location: | United States |
| Collateral Types: | Example acceptable collateral types: property, plant and equipment, accounts receivable, inventory, real estate |

TABLE 3

Example Policy Risk Guidelines-Loan

| Business Characteristics | Guidelines |
|---|---|
| Timing: | Policy may be granted within 180 days after business loan origination (no mid-term policy originations) |
| Loan Type: | Exclude Small Business Administration (SBA) loans |
| Loan Size: | Predetermined minimum and maximum per policy |

TABLE 4

Example Policy Risk Guidelines-Lender

| Lender Characteristics | Underwriting Guidelines |
|---|---|
| Credit Policy: | Personal guarantys required for a high percentage of total loans originated, minimum net worth requirements, etc. |
| Credit Quality Statistics: | Historically low net charge-offs in relation to the lender's peer group; gross charge-offs |

TABLE 4-continued

Example Policy Risk Guidelines-Lender

| Lender Characteristics | Underwriting Guidelines |
|---|---|
| Credit monitoring: | Lender actively monitors credit of entities who receive loans from the lender |
| Asset Value: | Smaller lenders by asset value preferred |

In various embodiments, the policy risk module 312 therefore attempts to determine, among other things, whether the guarantor is responsible, whether the business is stable and profitable, whether the timing and other characteristics of the loan is acceptable, and whether the bank is conservative in its lending practices. If the policy risk module 312 determines that some or all of the characteristics of the guarantor, business, loan, industry, and lender comport with some or all of the guidelines, the policy risk module 312 may determine that the policy risk is acceptable. The specific type and number of characteristics used to make this determination can be set by the insurer.

The portfolio risk 314 module may be a software component or the like that can determine whether providing a policy to the guarantor would represent an unacceptable portfolio risk. In an embodiment, an unacceptable portfolio risk represents a risk of accumulation to the insurer's portfolio. If the risk management module 310 determines that the policy and portfolio risks are acceptable (e.g., that the policy and portfolio risks are below a threshold of risk), the risk management module 310 may determine that the guarantor may be given a PGI policy. The portfolio risk module 312 may also compare the characteristics with data obtained from an actuarial database.

The portfolio risk module 314 can analyze the various guarantor, business, loan, industry, and lender characteristics according to one or more risk factors to determine portfolio risk. Table 5 below illustrates various example portfolio risk factors that may be considered.

TABLE 5

Example Portfolio Risk Factors

| Factors | Example Considerations |
|---|---|
| Loan Type: | Commercial real estate, construction and development, commercial and industrial |
| Geography: | Within United States, specific foreign countries, etc. |
| Failure Rate By Industry: | Industries that tend to have high failure rates (e.g., Restaurants) |
| Loan Size: | Diversification across loan size; avoid overweighting |
| Number of Contingent Liabilities Outstanding: | Total amount of guarantys outstanding |

The portfolio risk module 314 may consider data representative of the factors in Table 5, as well as economic conditions, economic forecasts, the composition of lenders, and other factors in order to diversify policies so as to reduce the risk of accumulation. In one embodiment, the portfolio risk module 314 weighs the factors in Table 5 and/or other factors to determine whether the portfolio risk is acceptable. If so, and if the policy risk module 312 determines that the policy risk is acceptable, the risk management module 310 can indicate to the policy generator 320 that a policy should be created. In addition, in some embodiments, the risk management module 310 can provide a numerical or other indicator of the degree of potential policy and/or portfolio risk levels to the policy generator 320. The risk management module 310 may also provide visual feedback to a user, e.g., on a display, indicating whether the business represents a policy and/or portfolio risk.

As one example, the portfolio risk module 314 may access data representing business types corresponding to the Standard Industrial Classification (SIC) or North American Industrial Classification System (NAICS). For instance, the portfolio risk module 314 may access a two-to-four digit SIC code corresponding to the business, e.g., from an online data repository. If the insurer has insured a certain number of businesses that have the same (or similar) SIC code, the portfolio risk module 314 may determine that this business represents a portfolio risk.

The policy generator 320 may be a software component or the like that generates a PGI policy 322. The policy generator 320 may generate a PGI policy in response to receiving a message from the risk management module 310 having one or more indicators of the degree of potential policy and/or portfolio risk levels. The policy generator 320 may determine a premium and/or other parameters of the PGI policy based at least in part on the indication of the degree of potential risk provided by the risk management module 310. Alternatively, the policy generator 320 may determine the premium and/or other parameters of the PGI policy directly based at least in part on actuarial data, characteristics of the guarantor, business, loan, industry, and lender, combinations of the same, and the like. Thus, in certain embodiments, the policy generator 320 may transform the risk indicators received from the risk management module 310 into a policy with a premium. The policy generator 320 may also transform the characteristics data directly into a policy with a premium.

In addition, the policy generator 320 may select a risk apportionment or variable retention model 321 to apply to the policy 322 based at least in part on actuarial data, characteristics of the guarantor, business, loan, industry, and lender, combinations of the same, and the like. Different variable retention models 321 are described below with respect to FIG. 5. In general, variable retention models 321 that apportion more risk to the guarantor may be selected for guarantors, loans, lenders, industry, or businesses that present higher risk to the insurer. Alternatively, the policy generator 320 uses the same variable retention module 321 for some or all policyholders but calculates a different premium for some or all policyholders. Once the policy generator 320 has generated the policy 322 providing for a variable retention module 321, the policy generator 320 may provide the policy (e.g., as an electronic document or the like) to the insurer and/or guarantor.

The claims module 330 may be a software component or the like that calculates variable retentions 332 and claim amounts 340 based at least partly on inputs such as the liquidation value of a business's assets and the aggregate liability on a loan, as described below with respect to FIG. 5. One example process that the claims module 330 may use is described below with respect to FIG. 6.

Figure 4:
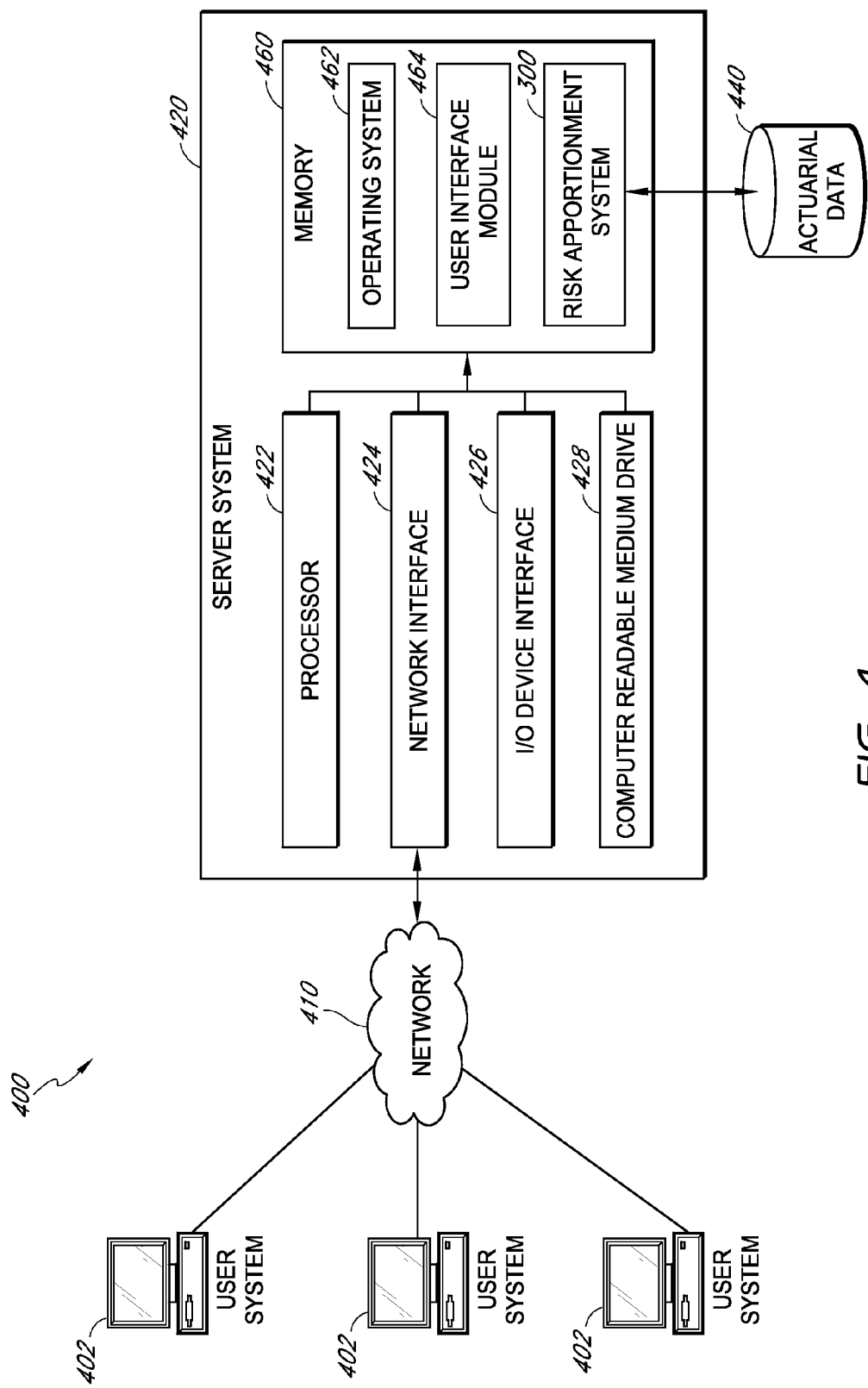
FIG. 4 is a block diagram illustrating an embodiment of a network environment for implementing the risk apportionment system of FIG. 4.

FIG. 4 depicts an embodiment of a network environment 400 for providing users with access to a risk apportionment system 300 of FIG. 3. The network environment 400 includes a server system 420 for providing users with access to the risk apportionment system 300. While the risk apportionment system 300 is depicted as implemented by a single computing device (server system 420), this is illustrative only. In certain embodiments, the risk apportionment system 300 may be embodied in a plurality of server systems or other physical computing machines, each executing an instance of the risk apportionment system 300. These server systems may be distributed geographically or may be co-located.

The server system 420 may provide network applications such as web applications for access by users via user systems 402. The user systems 402 may include various types of computing devices, such as, for example, desktop computers, workstations, web pads, personal digital assistants (PDAs), mobile phones, set-top television boxes, media players, laptop computers, tablets, combinations of the same and the like. The user systems 402 can further include various software applications for accessing the server system 420, such as browser software applications, stand-alone software applications, plug-ins, interfaces, combinations of the same, and the like. The user systems 402 may access the server system 420 over a network 410, which may include a local or wide area network (LAN or WAN), such as an organization's intranet, the Internet, combinations of the same, and the like.

The general architecture of the server system 420 includes an arrangement of computer hardware and software components that may be used to implement the risk apportionment system 300. Although not shown, the server system 420 may include many more (or fewer) components than those shown in FIG. 4. As illustrated in FIG. 4, the server system 420 includes a network interface 424, a processing unit 422, an input/output interface 426, and a computer readable medium drive 428, all of which may communicate with one another by way of a communication bus. The network interface 424 may provide connectivity to the network 410 and/or other networks or computing systems. The processing unit 422 may receive information and instructions from other computing systems via the network 410. The processing unit 422 may also communicate to and from a memory 460 and further provide output information for an optional display (not shown) via the input/output device interface 426.

The memory 460 can contain computer program instructions that the processing unit 422 executes in order to operate the risk apportionment system 300. The memory 460 generally includes RAM, ROM, and/or other persistent memory. The memory 460 may store an operating system 432 that provides computer program instructions for use by the processing unit 422 in the general administration and operation of the risk apportionment system 300. The memory 460 may further include computer program instructions and other information for implementing features of the risk apportionment system 300. For example, in one embodiment, the memory 460 includes a user interface module 434 that generates user interfaces for display upon a user system 402, e.g., via a navigation interface such as a web browser installed on the user system 402. In addition, the memory 460 may include or communicate with an actuarial database 440 that can include the actuarial data described above with respect to FIG. 4.

As shown, the memory 460 may include the risk apportionment system 300, which may be executed by the processing unit 422. In one embodiment, the risk apportionment system 300 provides the functionality to, for example, receive guarantor, business, loan, industry, and lender characteristics from the user systems 402. In one embodiment, for example, the risk apportionment system 300 generates one or more forms for users 402 to input these characteristics. The forms may be accessed, for example, using browser software on the user systems 402. The risk apportionment system 300 may use these characteristics together with data stored in the actuarial database 440, as described above, to evaluate risk, determine premiums, and generate policies. In addition, the risk apportionment system 300 may also provide interfaces or forms for users to process claims, pay premiums, upload financial documents, and the like.

Figure 5A:
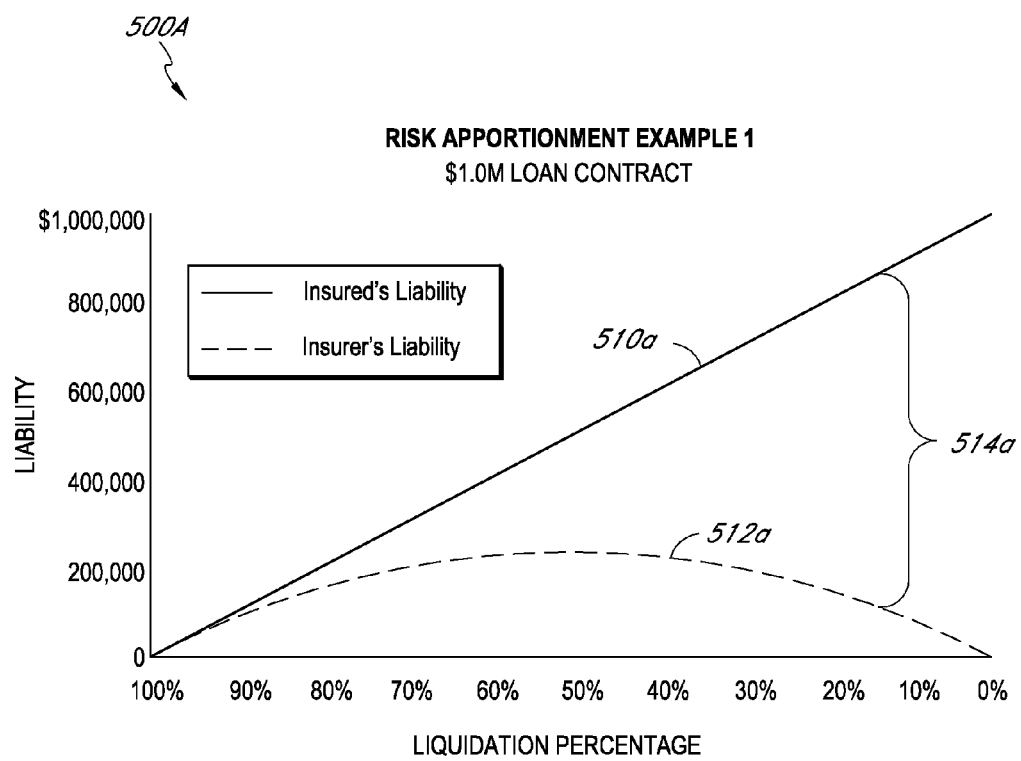
FIGS. 5A through 5C are graph diagrams illustrating risk apportionment insurance examples.
Figure 5B:
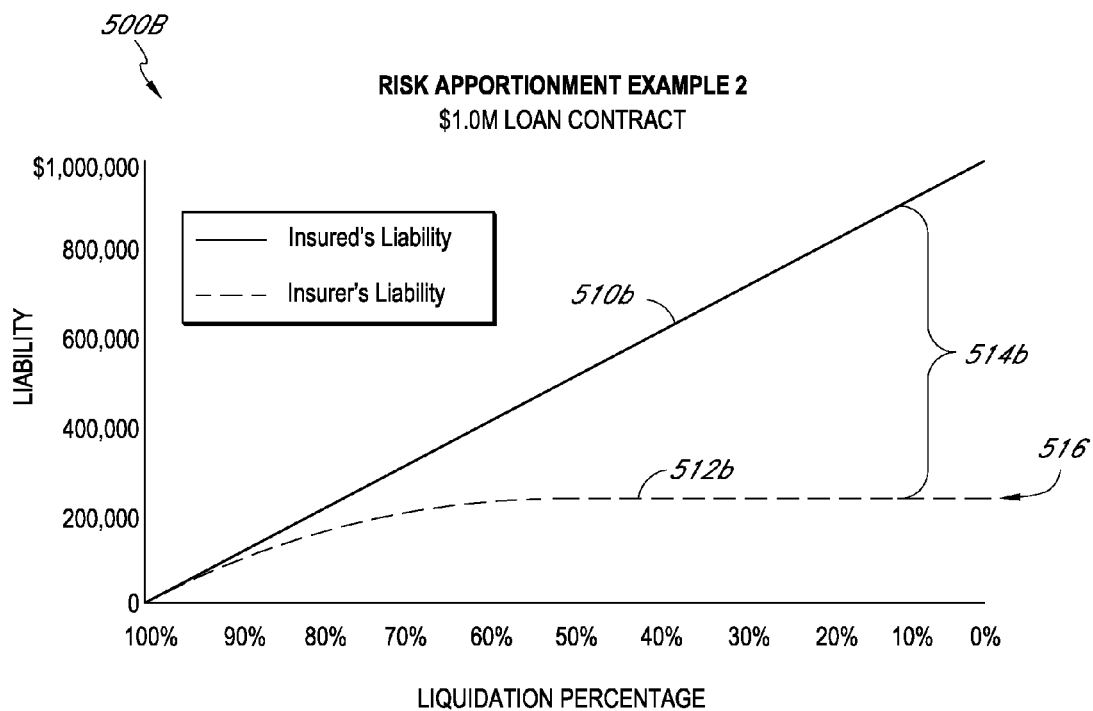
Figure 5C:
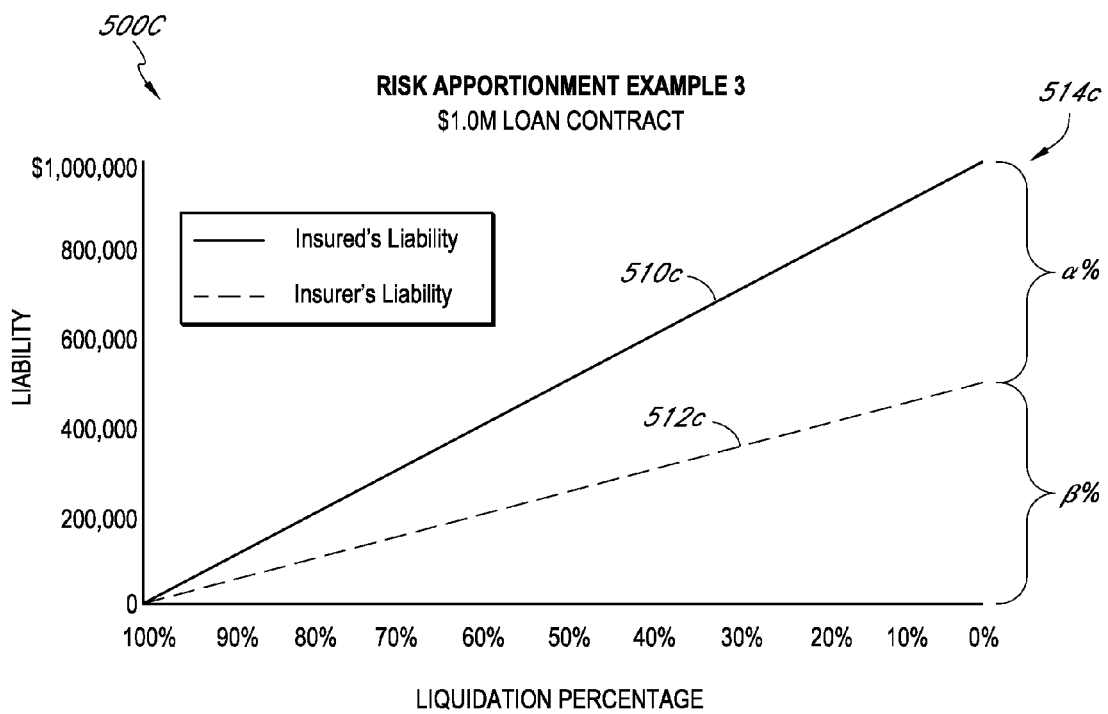

FIGS. 5A through 5C depict graphs 500 that illustrate models or examples of risk apportionment. Computations involving these models may be performed by a computer system, such as the systems described above with respect to FIGS. 3 and 4. For ease of illustration, the risk apportionment examples shown are described in the context of PGI. However, certain aspects of the examples shown may also apply to other types of risk apportionment insurance.

Each of the graphs 500 depicted in FIGS. 5A through 5C illustrates an guarantor's liability on an example one million dollar loan (indicated by solid trace 510) and an insurer's liability to the guarantor (indicated by dashed trace 512) according to an insurance policy. The x-axis of each graph 500 represents the guarantor's liquidation percentage. One definition of the liquidation percentage can be the liquidation value of the business collateral (see FIG. 1) divided by the aggregate liability on the loan. The aggregate liability may be the outstanding loan amount or the outstanding loan amount plus any interest and/or fees (e.g., for late payment). As an example, if the liquidation value of the business collateral prior to liquidation is $400,000 and the aggregate liability is $800,000, under this definition, the guarantor's liquidation percentage would be $400,000/$800,000=50%. While represented as a percentage in this example, the liquidation percentage may instead be represented as a ratio.

Typically, the lender reserves the right to pursue either the personal guaranty or the business assets in any order. However, in certain embodiments, the liquidation value is required by the PGI policy to be determined after the lender liquidates the business collateral. In other words, net personal guarantee liability may be used to determine payout of any claims, rather than gross personal guarantee liability. For instance, the PGI policy may include a provision requiring the business assets to be liquidated before the insurer will pay any claims. This provision may prevent or delay the lender from requesting the guarantor's collateral (and hence the PGI claim proceeds) before obtaining the business's collateral. As a result, this provision may incent beneficial behavior by the business, lender, and guarantor.

The y-axis of each graph 500A, 500B, and 500C represents liability of the insurer and the guarantor. The liability of the insurer will be discussed in greater detail below. The liability of the guarantor, referred to as the personal guaranty liability, may be defined as the difference between the liquidation value of the business collateral and the aggregate liability. To illustrate, if the liquidation value of the business collateral is $400,000 and the aggregate liability (e.g., outstanding loan amount) is $800,000, the guarantor's personal guaranty liability could be $800,000−$400,000=$400,000.

On each graph 500, the personal guaranty liability is illustrated by the trace 510, which represents a line with an increasing slope. This slope indicates that in certain situations, as the liquidation percentage decreases, the guarantor's personal guaranty liability increases. This trace 510 may be other than a line in other embodiments. For instance, when the personal guaranty liability is determined using the aggregate liability on the loan, the guarantor's liability may fluctuate based on interest and fees.

The trace 512, representing the insurer's liability, is different in each graph 500A, 500B, and 500C. In certain embodiments, the difference between the insurer's liability (trace 512) and the guarantor's liability (trace 510) represents a variable retention 514. This variable retention 514 may represent a risk of liability retained by the guarantor. The retention 514 can vary with the liquidation percentage and/or personal guaranty liability. In certain embodiments, the variable retention 514 increases as the liquidation percentage decreases, on either a proportional or dollar basis.

The variable retention 514 may be measured at a liquidation or other claim-triggering event. Thus, in some scenarios, the value of the variable retention 514 may not be determined until one of these outcomes occurs. In other embodiments, the variable retention 514 may be measured over time before an outcome occurs, and may therefore vary with time as well.

Referring to FIG. 5A, the variable retention 514a is relatively higher at lower values of the liquidation percentage and relatively lower at lower values of the liquidation percentage. The variable retention 514a in FIG. 5A may be represented by the following equation:

$$VR = (100\% - m \cdot LP) \cdot PGL \qquad (1)$$

where VR represents the variable retention 514a, LP represents the liquidation percentage, PGL represents the personal guaranty liability, and m is an optional modifier (described below). If the liquidation percentage is calculated as a ratio instead of a percentage, the variable retention 514a may instead be represented as:

$$VR = (1 - m \cdot LR) \cdot PGL \qquad (2)$$

where LR represents the liquidation ratio.

As can be seen from equations (1) and (2), the variable retention 514a can change in value as the liquidation percentage (or ratio) changes. Similarly, the variable retention 514a can change as the personal guaranty liability changes. For example, at low values of the liquidation percentage, the guarantor retains most of the risk, while at higher liquidation percentage values, the guarantor retains less risk. As a result, in certain embodiments, the example variable retention 514a of FIG. 5A can provide an incentive for the guarantor to preserve asset value. The variable retention 514a may therefore allow the insurer to offer PGI while reducing or preventing moral hazard and/or adverse selection.

The modifier m, when less than 1, increases the variable retention 514a. If more than 1, the modifier m decreases the variable retention 514a and provides for 100% insurance coverage at certain liquidation percentages less than 100%. In the depicted graph 500, the modifier m is equal to 1. In one embodiment, the modifier is constrained as follows:

$$0 \leq m \cdot LR \leq 1. \qquad (3)$$

In certain embodiments, the modifier can be used to address specific business, industry, or loan characteristics that influence risk. For instance, for a guarantor associated with an industry having low default risk, the modifier may be adjusted to provide 100% coverage at certain liquidation percentages.

Some guarantors may prefer to retain less risk than that shown in FIG. 5A. Insurers may therefore offer different variable retention structures, such as the variable retentions 514b and 514c shown in FIGS. 5B and 5C, respectively. Referring to FIG. 5B, the insurer's liability 512b is depicted having a floor 516 at relatively smaller values of the liquidation percentage. The floor 516 may be considered to be a minimum insurance value for the guarantor in low liquidation value situations. In this scenario, the variable retention 514b may be represented as:

$$VR = \begin{cases} PGL - F, & LP \leq FP \\ (100 - m \cdot LP) \cdot PGL, & LP > FP \end{cases} \qquad (4)$$

where $$F = m \cdot FP \cdot PGL_{FP}. \tag{5}$$

In equations (4) and (5), F represents the floor value, FP represents a fixed floor percentage, and $PGL_{FP}$ represents the value of PGL evaluated when LP=FP. The value of the modifier m is 1 in FIG. 5B but may be varied. Equations (4) and (5) may be modified in a similar manner to equation (2) above to use ratios instead of percentages.

In the embodiment shown, an example FP of 50% has been chosen. When LP=FP, the value of PGL is $500,000. Hence, the floor F has a value of $500,000*50%=$250,000 for LP values ranging from 0 to 50%. Thus, the insurer's liability 512b remains at a constant level of $250,000 for certain LP values in the present example. Because PGL continues to grow as LP decreases, the variable retention VR still increases as LP decreases. However, in the example embodiment, the variable retention VR is less than the variable retention in FIG. 5A for LP values less than 50%. For LP values above the floor percentage FP, the insurer's liability 512b essentially varies according to equation (1) and (2).

Providing a policy with a floor can be advantageous for certain businesses with limited business collateral, such as service-based businesses. In addition, a policy with a floor can be attractive for guarantors primarily concerned about catastrophic risk. Moreover, the existence of the floor in certain policies may allow the guarantor to perform a simple return on investment (ROI) calculation regarding the premiums to be paid. Because the retention can still be substantial with the floor in place, in certain embodiments moral hazard and adverse selection may still be reduced or avoided.

A third model of variable retention 514c is shown in FIG. 5C. This model represents a constant sharing of risk between a guarantor and an insurer. The guarantor retains a % of the liability, while the insurer retains β% of the liability for all or substantially all liquidation percentage values. Thus, the variable retention may be represented as:

$$VR = \alpha\% \cdot PGL \tag{6}$$

The graph 500C illustrates the example case where $\alpha = \beta = 50\%$, such that the risk is shared equally between the guarantor and insurer. The variables $\alpha$ and $\beta$ may be represented as ratios instead of percentages in certain implementations. In one embodiment, $\alpha\%$ is greater than or equal to 50%, to avoid incentivizing moral hazard and/or adverse selection.

The retention may also be represented with respect to liquidation percentage. The guarantor and insurer may agree upon this liquidation percentage beforehand (e.g., when creating the PGI policy). Thus, the variable retention may be represented as:

$$VR = (100\% - m \cdot LP_{FIXED}) \cdot PGL \tag{7}$$

where $LP_{FIXED}$ represents the agreed-upon liquidation percentage. To illustrate, if the agreed-upon liquidation percentage is 50%, if the modifier is 1, and if the PGL is $640,000, the variable retention would be (100%−50%)*$640,000=$320,000.

In addition to the examples shown in FIGS. 5A through 5C, many other models for variable retention may be employed. For instance, the insurer's liability may be depicted as a series of steps having values that increase as the liquidation percentage decreases. In another embodiment, a modifier similar to the modifier of equation (1) may be employed with equation (6) to result in 100% coverage for certain liquidation percentages. Many other configurations are also possible.

Figure 6:
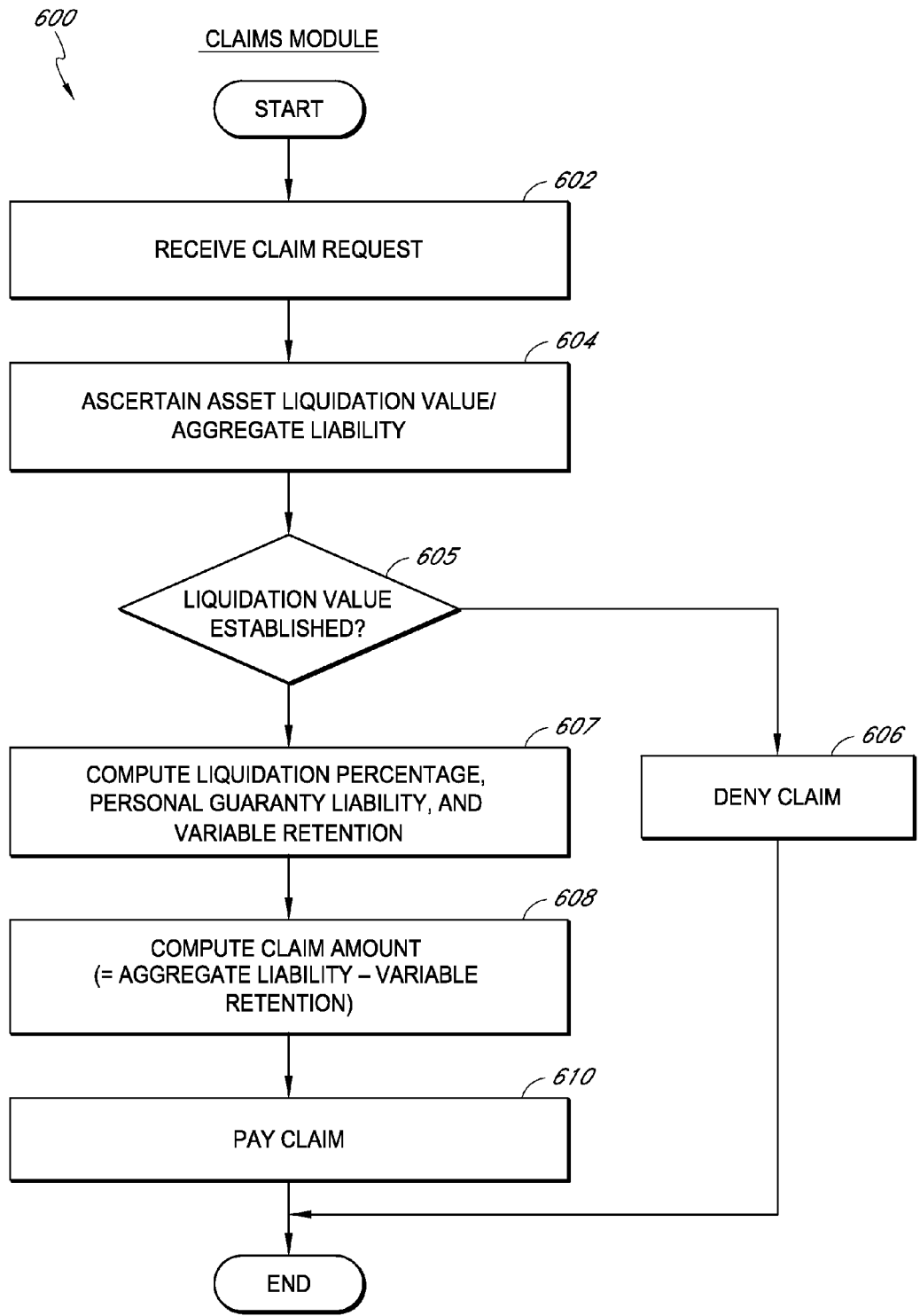
FIG. 6 is a flowchart illustrating an embodiment of a process for computing a claim amount for a risk-apportionment insurance policy.

FIG. 6 illustrates an embodiment of a claims process 600 for computing a claim using a variable retention. The claims process 600 may be implemented by a computer system, such as by one of the systems described above with respect to FIGS. 3 and 4.

At block 602, a claim request may be received from a PGI policyholder, such as a guarantor (see FIG. 1A) or business (see FIG. 1B). The claims request may be received, for example, by the claims module 330 electronically, such as over the network 410 described above. For instance, the policyholder may transmit a claims request or the like to the insurer using a web application over the network 410 or by some other way, such as via phone or fax.

Advantageously, in certain embodiments, the insurer may include a provision in the PGI policy that provides that claims will be paid once the insurer knows the liquidation value of the business assets. Thus, once the claim has been initiated, at block 604, aggregate liability and asset liquidation values may be ascertained by the insurer. If it is determined at block 605 that the liquidation value has not been established, the claim is denied at block 606.

Otherwise, if the liquidation value has been established, at block 607, a liquidation percentage, personal guaranty liability, and variable retention are computed. The variable retention may be computed based on the liquidation percentage, personal guaranty liability, and/or based on other factors, as described above with respect to FIG. 5. Thus, in one embodiment, the aggregate liability and/or liquidation percentage are transformed into a variable retention amount. At block 608, a claim amount may be computed by subtracting the variable retention from the aggregate liability. The claim may be paid by the insurer to the guarantor at block 610.

The various blocks and modules of the systems described herein can be implemented as software applications, hardware and/or software modules, or components on one or more computers, such as servers. While the various modules are illustrated separately, they may share some or all of the same underlying logic or code. In addition, each of the processes, components, and algorithms described above may also be embodied in, and fully automated by, modules executed by one or more computers or computer processors. The modules may be stored on any type of computer-readable medium or computer storage device. The processes and algorithms may also be implemented partially or wholly in application-specific circuitry. The results of the disclosed processes and process steps may be stored, persistently or otherwise, in any type of computer storage.

In one embodiment, the modules may be configured to execute on one or more processors, including sub-processors. In addition, the modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, variables, combinations of the same, and the like.

The various features and processes described above may be used independently of one another, or may be combined in various ways. All possible combinations and subcombinations are intended to fall within the scope of this disclosure. In addition, certain method or process blocks or steps may be omitted in some implementations. The methods and processes described herein are also not limited to any particular sequence, and the blocks, states, or steps relating thereto can be performed in other sequences that are appropriate. For example, described blocks, states, or steps may be performed in an order other than that specifically disclosed, or multiple blocks, states, or steps may be combined in a single block, state, or step.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A risk apportionment system for providing personal guaranty insurance to a guarantor, the guarantor having received a loan from a lender for an organization associated with the guarantor, the guarantor being required by the lender to provide a personal guaranty on the loan, the personal guaranty obligating the guarantor to pay a personal guaranty liability, the personal guaranty liability comprising a difference between an aggregate liability on the loan and an asset liquidation value of the organization, the system comprising:
   one or more processors configured to execute a policy generator and a claims module, the policy generator comprising a policy risk management module and a portfolio risk management module;
   the policy risk management module configured to determine a degree of policy risk by programmatically evaluating characteristics of the guarantor, the organization, the loan, and the lender, wherein:
      the characteristics of the guarantor comprise one or more of the following: prior bankruptcies, credit score, criminal history, net worth, other contingent liabilities, and length of time associated with the lender;
      the characteristics of the organization comprise one or more of the following: longevity of the organization, type of the organization, type of the loan, geographic location of the organization, types of assets owned by the organization, and other insurance coverage of the organization;
      wherein the characteristics of the loan comprise one or more of the following: origination timing, loan contract type, and loan contract size;
      the characteristics of the lender comprise one or more of the following: asset value of the lender, a percentage of personal guarantys required by the lender for a total number of loans originated by the lender, and credit monitoring characteristics of the lender; and
   the portfolio risk management module configured to determine a degree of portfolio risk by programmatically evaluating one or more of the following portfolio risk factors: assets integral to the organization, the type of assets owned by the organization, the geographic location of the organization, industry of the organization, and size of the loan; and
   wherein the policy generator, in response to the determination that the degrees of policy and portfolio risk represented by the guarantor are below a threshold of risk, is configured to generate an insurance policy between the guarantor and an insurer corresponding to the guaranty, the insurance policy comprising the premium and providing for a variable retention of risk by the guarantor, wherein a value of the variable retention comprises at least a portion of the guaranty liability; and
   the claims module configured to, in response to a request for a claim on the personal guaranty insurance policy:
      compute a liquidation percentage (LP), the liquidation percentage comprising the asset liquidation value of the organization divided by the aggregate liability of the loan, the aggregate liability comprising an outstanding loan amount plus interest and fees;
      compute the personal guaranty liability (PGL);
      compute the variable retention (VR), wherein the variable retention is represented as $VR=(1-m*LP)*PGL$, where m represents a modifier value; and
      compute a claim amount of the personal guaranty insurance, the claim amount comprising the aggregate liability minus the computed variable retention.

2. The system of claim 1, wherein the claims module is further configured to compute a higher said retention at a relatively lower value of the liquidation percentage compared with a lower said retention at a relatively higher value of the liquidation percentage.

3. The system of claim 1, wherein the claims module is further configured to compute a lower said claim amount at a relatively lower value of the liquidation percentage compared with a higher said claim amount at a relatively higher value of the liquidation percentage.

4. The system of claim 1, wherein the claims module is further configured to provide a floor to the claim amount, wherein the floor is configured to ensure that a minimum claim amount is provided to the guarantor.

* * * * *

UNITED STATES PATENT AND TRADEMARK OFFICE
CERTIFICATE OF CORRECTION

PATENT NO. : 8,095,396 B1
APPLICATION NO. : 12/403964
DATED : January 10, 2012
INVENTOR(S) : Zublin et al.

Page 1 of 1

It is certified that error appears in the above-identified patent and that said Letters Patent is hereby corrected as shown below:

In column 13 at line 34 (approx.) change "a" to --$\alpha$--.

In column 15 at line 41 (approx.) In Claim 1, change "processers" to --processors--.

Signed and Sealed this
Fifth Day of June, 2012

David J. Kappos
*Director of the United States Patent and Trademark Office*